United States Patent
Nishi et al.

(10) Patent No.: US 6,286,539 B1
(45) Date of Patent: Sep. 11, 2001

(54) FUEL CUTOFF VALVE AND FUEL TANK WITH FUEL CUTOFF VALVE MOUNTED THEREON

(75) Inventors: Hiroshi Nishi, Nagoya; Masayuki Nakagawa, Iwakura; Tomohiro Sugizaki, Kasugai, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/494,510

(22) Filed: Jan. 31, 2000

(30) Foreign Application Priority Data

Mar. 15, 1999 (JP) .................................................. 11-067924

(51) Int. Cl.$^7$ .................................................. F16K 24/04
(52) U.S. Cl. .............................................. 137/202; 137/43
(58) Field of Search ........................................ 137/43, 202

(56) References Cited

U.S. PATENT DOCUMENTS

| | | | |
|---|---|---|---|
| 5,404,907 | | 4/1995 | Benjey et al. .......................... 137/587 |
| 5,522,417 | * | 6/1996 | Tomioka et al. ................... 137/202 X |
| 5,873,382 | * | 2/1999 | Hattori et al. .......................... 137/202 |
| 5,944,044 | * | 8/1999 | King et al. ............................. 137/202 |
| 5,960,819 | * | 10/1999 | Weissinger et al. ................ 137/43 X |
| 5,975,116 | * | 11/1999 | Rosas et al. ....................... 137/202 X |
| 5,992,441 | * | 11/1999 | Enge et al. ............................. 137/202 |
| 6,035,883 | * | 3/2000 | Benjey ................................... 137/202 |
| 6,035,884 | * | 3/2000 | King et al. ............................. 137/202 |
| 6,058,963 | * | 5/2000 | Enge et al. ............................. 137/202 |

* cited by examiner

Primary Examiner—Gerald A. Michalsky
(74) Attorney, Agent, or Firm—Pillsbury Winthrop LLP (57) ABSTRACT

A fuel cutoff valve is mounted on an upper wall of a fuel tank to open and close a connection conduit, so as to connect and disconnect the fuel tank with and from outside. The fuel cutoff valve of the present invention includes a casing, a cup-shaped float, a bottom plate, and a cover. Both the cover and the casing swell in the liquid fuel. The cover is made of a first resin material, which has the greater fuel swelling property than a second resin material that is applied for the casing. The cover is accordingly expanded to a greater degree than the casing. A holder unit disposed on the casing increases the supporting force against a support member of the cover with the swell of the cover. The casing is thus securely held by the cover via the holder unit and is not movable against the cover under the swelling condition of the cover. The fuel cutoff valve of the present invention accordingly attains the stable valve opening and closing properties without any possible troubles due to the unsteady joint, for example, a lowered mechanical strength against shocks or a variation in opening and closing liquid levels of the fuel cutoff valve.

11 Claims, 5 Drawing Sheets

FUEL CUTOFF VALVE AND FUEL TANK WITH FUEL CUTOFF VALVE MOUNTED THEREON

BACKGROUND OF THE INVENTION

1. Field of the Invention

The present invention relates to a fuel cutoff valve mounted on an upper wall of a fuel tank to open and close a connection conduit, which connects the inside of the fuel tank with the outside.

2. Description of the Related Art

Figure 5:
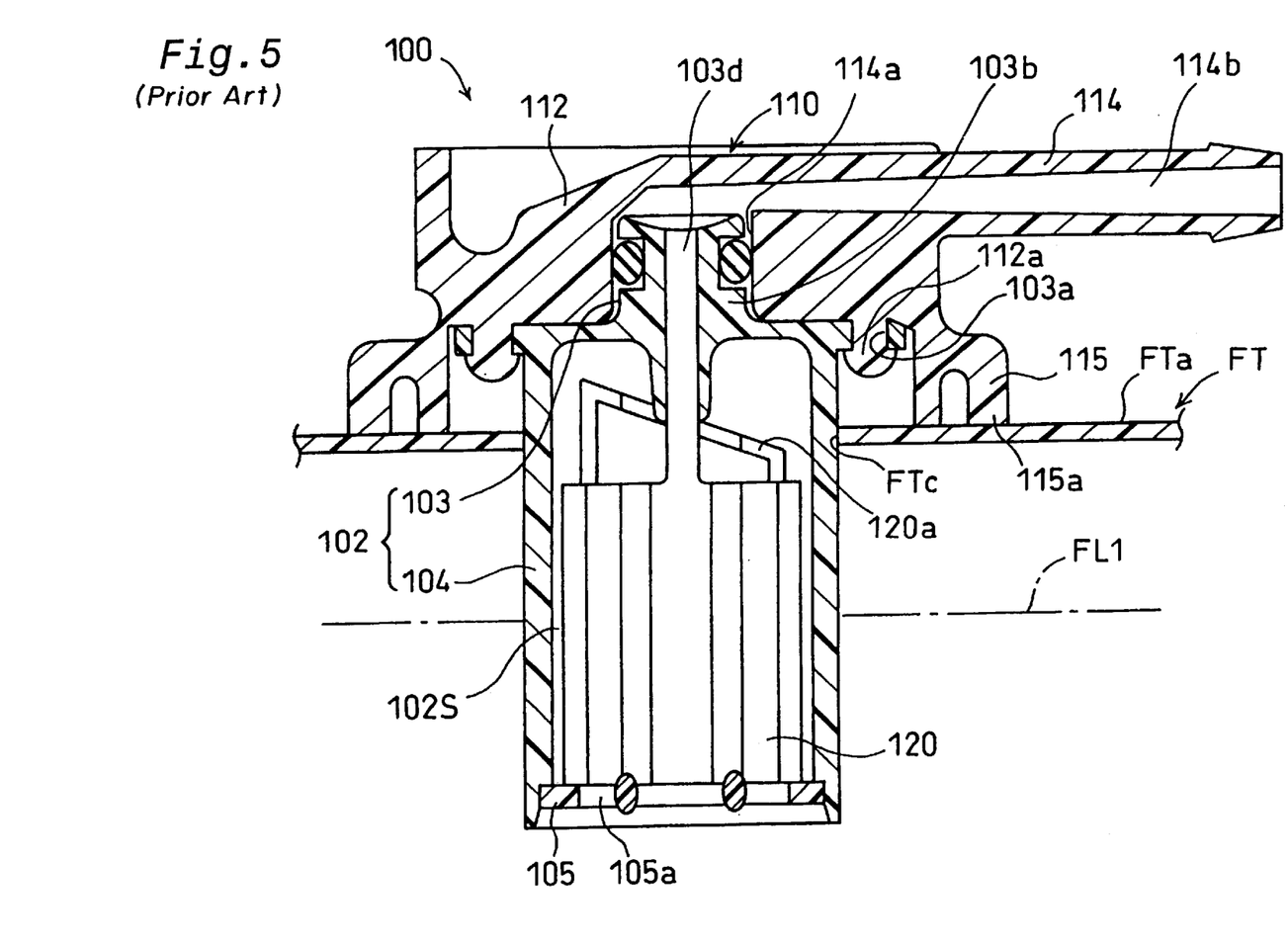
FIG. 5 is a sectional view illustrating a prior art fuel cutoff valve.

FIG. 5 shows a prior art fuel cutoff valve 100 having a known structure disclosed in U.S. Pat. No. 5,404,907. The fuel cutoff valve 100 is mounted on an upper tank wall FTa of a fuel tank FT, and includes a casing 102, a cover 110, a float 120, and a spring (not shown). The casing 102 has an upper wall 103, a side wall 104 that extends from the outer circumference of the upper wall 103 and is integrally molded with the upper wall 103, and a bottom plate 105 that is attached to a lower end of the side wall 104. An inner space of the casing 102 forms a valve chest 102S.

The float 120 having a valve element 120a disposed on an upper wall thereof is accommodated in the valve chest 102S. The valve element 120a opens and closes a connection conduit 103d that connects with inside of the fuel tank FT with outside. The float 120 is supported by the spring (not shown) mounted on the bottom plate 105.

The cover 110 includes a cover main body 112 fixed to the casing 102, a cover passage forming element 114, and a flange 115. These constituents of the cover 110 are integrally molded. The cover main body 112 has an attachment recess 114a, in which an upper projection element 103b of the upper wall 103 of the casing 102 is fitted. Engagement apertures 103a are formed in the upper wall of the casing 102 to receive engagement projections 112a formed on the cover 110 and fitted therein, so that the casing 102 is joined with the cover 110. A join end 115a of the flange 115 is thermally welded to the upper tank wall FTa of the fuel tank FT.

In the fuel cutoff valve 100 of the above structure, in the course of fuel supply into the fuel tank FT, the fuel vapor in the fuel tank FT flows out to a canister (not shown) via a through hole 105a formed in the bottom plate 105 of the casing 102, the valve chest 102S, the connection conduit 103d, and a passage 114b of the cover 110. When the level of the liquid fuel in the fuel tank FT reaches a particular level FLI, the liquid fuel flows into the valve chest 102S via the through hole 105a and gives the buoyancy to raise the float 120. The rise of the float 120 causes the valve element 120a formed on the upper wall of the float 120 to close the connection conduit 103d, so as to prevent the fuel from flowing out of the fuel tank FT.

In the prior art fuel cutoff valve 100, however, the joint of the casing 102 with the cover 110 is attained only through the engagement of the engagement projections 112a with the engagement apertures 103a and thereby readily becomes unsteady to make the casing 102 movable to the cover 110. The cover 110 is made of polyethylene and is thermally welded to the fuel tank FT, which is also made of polyethylene, whereas the casing 102 is made of polyacetal having a smaller fuel swelling property than polyethylene, in order to ensure the high sealing properties. Namely the cover 110 and the casing 102 are made of different resin materials. When the casing 102 and the cover 110 swell in the liquid fuel in the fuel tank FT, the difference in swelling properties between the cover 110 and the casing 102, which are joined with each other only through the engagement of the engagement apertures 103a with the engagement projections 112a, may cause the casing 102 to be movable against the cover 110. Such unsteady joint undesirably lowers the mechanical strength of the fuel cutoff valve 100 against shocks and varies the opening and closing liquid levels of the fuel cutoff valve 100. These lead to the unstable valve opening and closing properties.

SUMMARY OF THE INVENTION

The object of the present invention is thus to provide a fuel cutoff valve that does not move against an upper tank wall of a fuel tank even when swelling in a liquid fuel, but ensures stable valve opening and closing properties.

At least part of the above and the other related objects is attained by a fuel cutoff valve that is partly inserted in a fixation hole formed in an upper tank wall of a fuel tank, so as to be mounted on the upper tank wall. The fuel cutoff valve includes: a cover that is made of a first resin material, which enables the cover to be thermally welded to the upper tank wall, the cover including a circular welding end that is thermally welded to an upper surface of the upper tank wall to surround a circumference of the fixation hole, a fuel conduit that connects the fuel tank to outside, and a support member that is capable of being inserted into the fixation hole; a casing that is made of a second resin material, which has a smaller fuel swelling property than the first resin material, the casing having a valve chest that connects the fuel tank to a connection conduit; a valve member that is received in the valve chest to open and close the connection conduit according to a level of a liquid fuel in the fuel tank; mating engagement elements that are respectively formed on the support member and the casing and engage with each other, so as to join the support member with the casing; and a holder unit that is formed on the casing and is in contact with the support member, so as to be supported by the cover, the holder unit being arranged to increase a supporting force against the support member when the support member swells in the liquid fuel.

In the fuel cutoff valve of the present invention, the casing has the valve chest that connects with the fuel tank. The valve member received in the valve chest varies the buoyancy according to the level of the liquid fuel in the fuel tank, so as to ascend and descend in the valve chest. The valve member accordingly opens and closes the connection conduit and effectively prevents the fuel from flowing out of the fuel tank. In the fuel cutoff valve of the present invention, the cover is made of a resin material that enables the cover to be thermally welded to an upper wall of the fuel tank. The fuel cutoff valve of this configuration is readily mounted on the upper wall of the fuel tank without using any special fastening members.

Both the cover and the casing swell in the liquid fuel. The cover is made of the first resin material, which has the greater fuel swelling property than the second resin material that is applied for the casing. The cover is accordingly expanded to a greater degree than the casing. The holder unit disposed on the casing increases the supporting force against the support member of the cover with the swell of the cover. The casing is thus securely held by the cover via the holder unit and is not movable against the cover under the swelling condition of the cover. The fuel cutoff valve of the present invention accordingly attains the stable valve opening and closing properties without any possible troubles due to the unsteady joint, for example, a lowered mechanical strength against shocks or a variation in opening and closing liquid levels of the fuel cutoff valve.

In accordance with one preferable application of the present invention, the holder unit has a holder that is protruded from a side wall of the casing, so that a lower end of the support member is held by the side wall of the casing.

In this preferable application, the casing has an upper protrusion that forms part of the connection conduit, and the cover has a mating recess, in which the upper protrusion is fitted. A sealing member is interposed between the upper protrusion and the mating recess. This arrangement ensures the high sealing properties.

In one preferable embodiment, the mating engagement elements include an engagement projection that is protruded from the casing, and an engagement aperture that is formed on the support member and receives the engagement projection fitted therein. The support member has a plurality of slits that are arranged at an interval along a circumference thereof and are cut along an axis thereof.

It is preferable that the first resin material applied for the cover is polyethylene and that the second resin material applied for the casing is polyacetal.

In accordance with another preferable application of the present invention, the support member has a cylindrical body that defines the connection conduit, and the holder unit has a cylindrical body that is protruded from an upper wall portion of the casing to be in contact with an outer circumferential surface of the support member. A sealing member that seals the connection conduit from outside is interposed between the support member and the holder unit. This arrangement ensures the high sealing properties.

The present invention is also directed to a fuel tank including a resin upper tank wall with a fixation hole and a fuel cutoff valve that is partly inserted in the fixation hole, so as to be mounted on the upper tank wall. The fuel cutoff valve includes: a cover that is made of a first resin material, which enables the cover to be thermally welded to the upper tank wall, the cover including a circular welding end that is thermally welded to an upper surface of the upper tank wall to surround a circumference of the fixation hole, a fuel conduit that connects the fuel tank to outside, and a support member that is capable of being inserted into the fixation hole; a casing that is made of a second resin material, which has a smaller fuel swelling property than the first resin material, the casing having a valve chest that connects the fuel tank to a connection conduit; a valve member that is received in the valve chest to open and close the connection conduit according to a level of a liquid fuel in the fuel tank; mating engagement elements that are respectively formed on the support member and the casing and engage with each other, so as to join the support member with the casing; and a holder unit that is formed on the casing and is in contact with the support member, so as to be supported by the cover, the holder unit being arranged to increase a supporting force against the support member when the support member swells in the liquid fuel.

In the fuel tank of the present invention, it is preferable that the resin of the upper tank wall and the first resin material are polyethylene and that the second resin material is polyacetal.

DESCRIPTION OF THE PREFERRED EMBODIMENT

Figure 1:
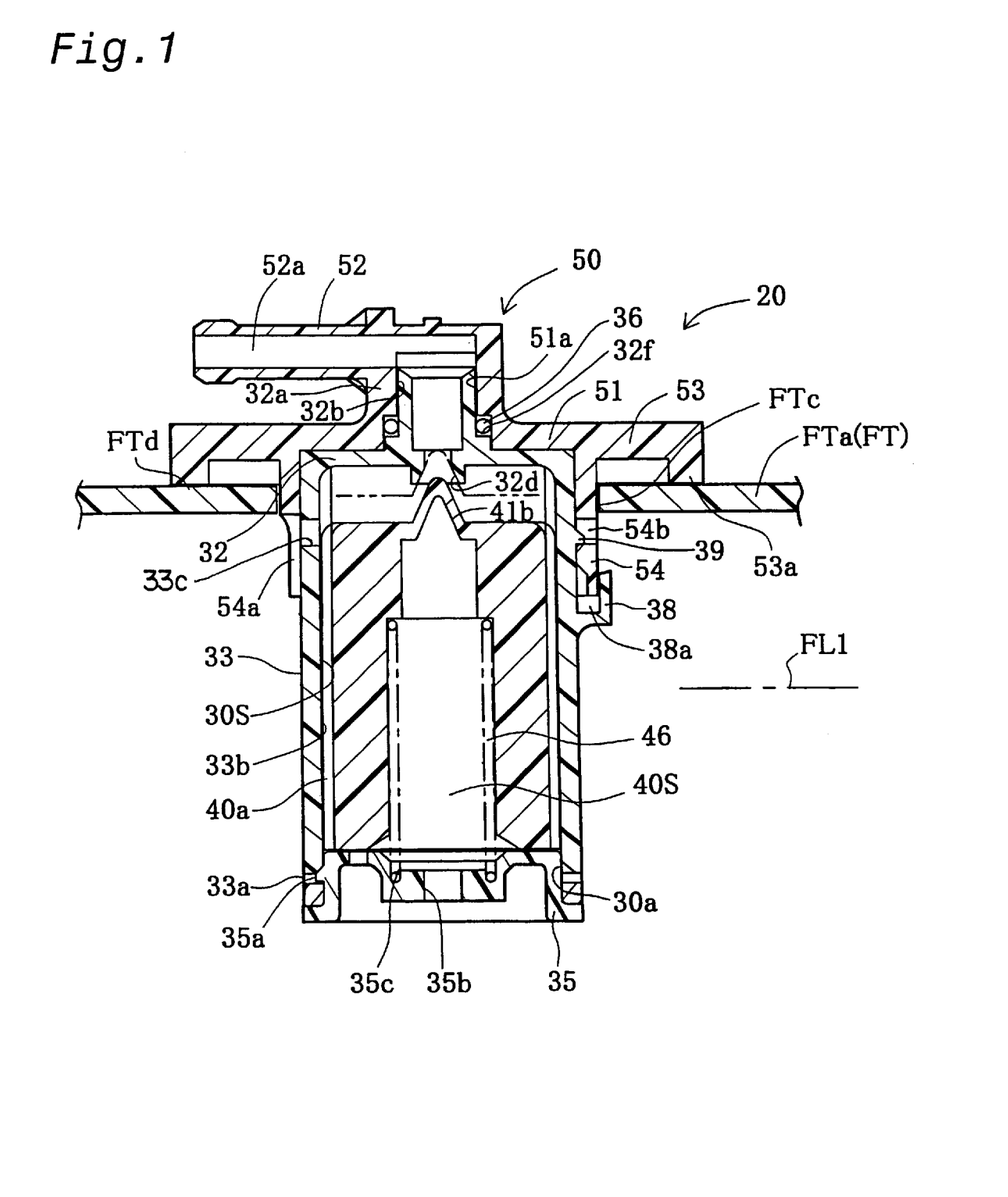
FIG. 1 is a sectional view illustrating a fuel cutoff valve mounted on an upper wall of a fuel tank of an automobile in one embodiment according to the present invention.

FIG. 1 is a sectional view illustrating a fuel cutoff valve 20 mounted on an upper wall of a fuel tank FT of an automobile in one embodiment according to the present invention. The fuel tank FT is made of a composite resin material containing polyethylene, and has a fixation hole FTc formed in an upper tank wall FTa thereof. The fuel cutoff valve 20 is attached to the upper tank wall FTa in the state that the lower portion of the fuel cutoff valve 20 is fitted in the fixation hole FTc. When the level of a liquid fuel in the fuel tank FT rises to a predetermined level FL1 by a supply of fuel, the fuel cutoff valve 20 prevents the fuel from flowing out to a canister (not shown).

Figure 2:
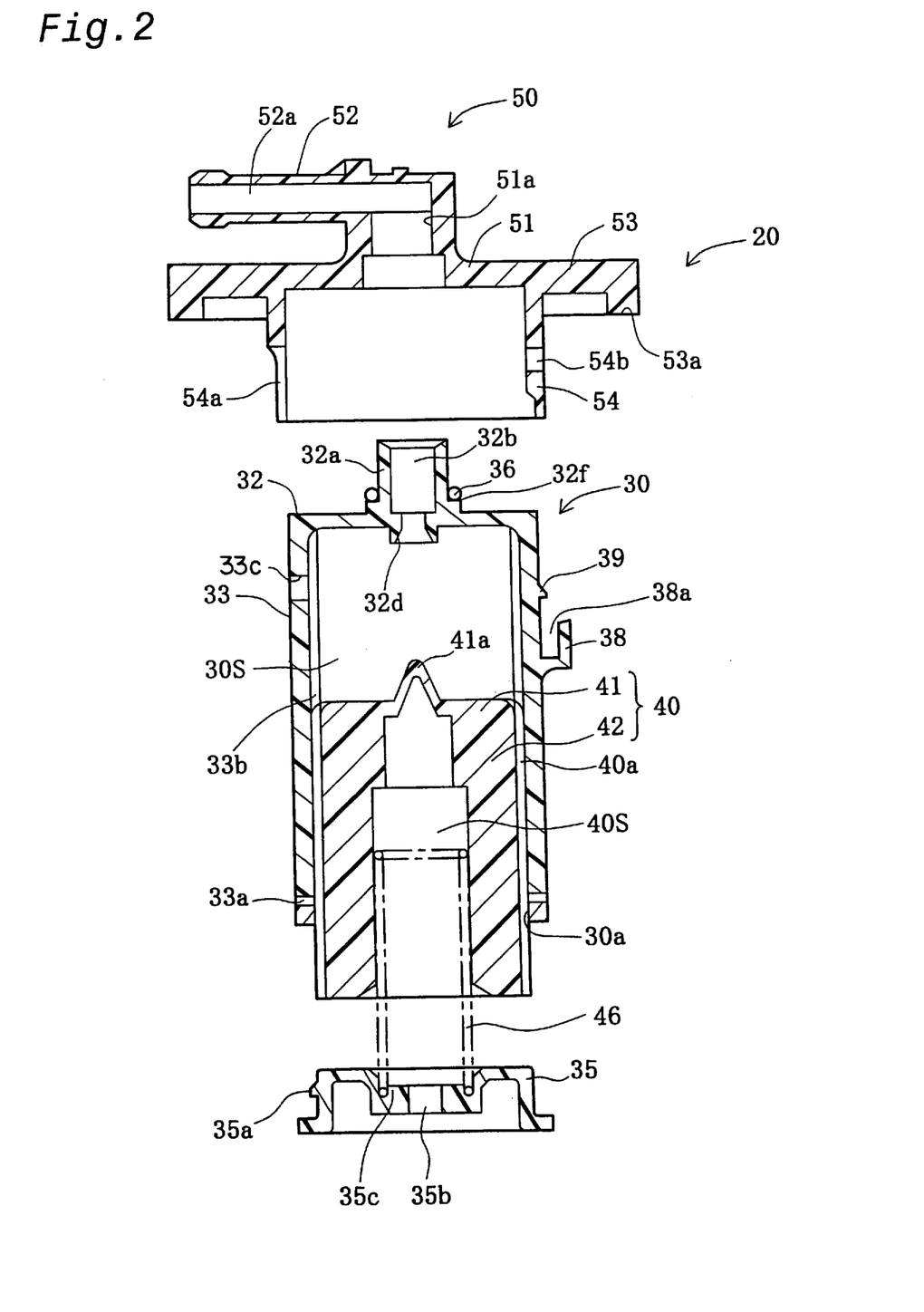
FIG. 2 is a decomposed sectional view illustrating the fuel cutoff valve.
Figure 3:
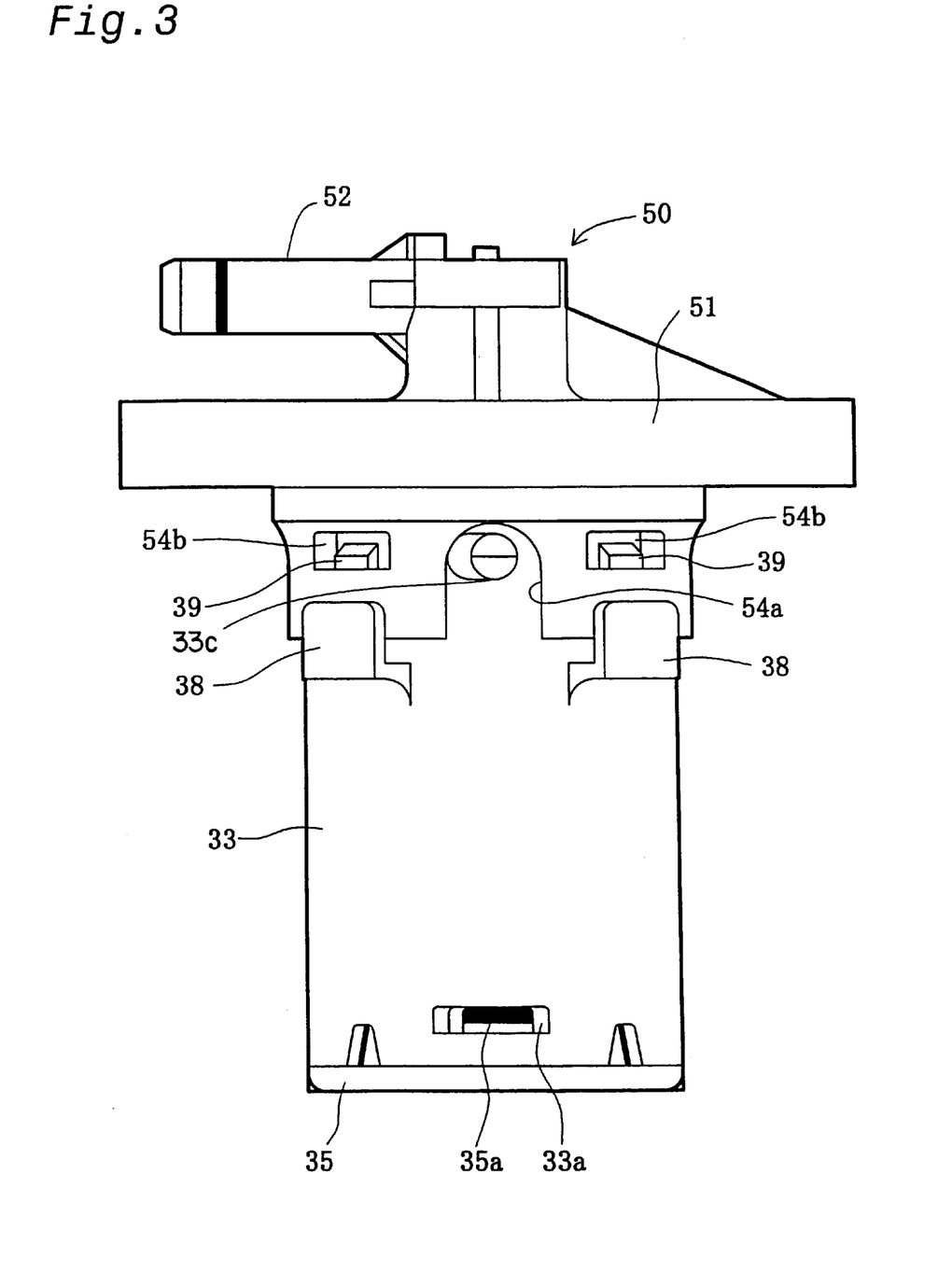
FIG. 3 is a side view of the fuel cutoff valve.

FIG. 2 is a decomposed sectional view illustrating the fuel cutoff valve 20, and FIG. 3 is a side view of the fuel cutoff valve 20. The fuel cutoff valve 20 has a casing 30, a bottom plate 35, a float 40, a spring 46, and a cover 50 as primary constituents. The casing 30, the bottom plate 35, and the 40 are made of a synthetic resin, polyacetal, having excellent fuel resistance. The cover 50 is made of polyethylene that has excellent fuel resistance and enables the cover 50 to be thermally welded to the fuel tank FT. Both of these resin materials have fuel swelling property, but polyacetal applied for the causing 30 and the float 40 has a smaller degree of fuel swelling than polyethylene applied for the fuel tank FT and the cover 50, so as to ensure the enhanced sealing properties.

The casing 30 has a top wall 32 and a cylindrical side wall 33 that extends downward from the top wall 32. A cup-like valve chest 30S is defined by the top wall 32 and the side wall 33, and has a lower opening 30a. An upper projection element 32a is formed on a substantial center of the top wall 32 of the casing 30. A connection conduit 32b passes through the upper projection element 32a. One end of the connection conduit 32b close to the valve chest 30S forms a cone-shaped seat 32d. A ring step 32f is formed on an outer circumferential face of a side wall of the upper projection element 32a to support an O ring 36.

Engagement apertures 33a are formed in a lower portion of the side wall 33. The engagement apertures 33a are used to fix the bottom plate 35 as described later. A guide protrusion 33b is formed along a vertical axis on the inner circumferential surface of the side wall 33 to guide the float 40.

The bottom plate 35 closes the lower opening 30a of the casing 30. More concretely, engagement elements 35a formed on the outer circumferential surface of the bottom plate 35 are fitted in the engagement apertures 33a, so that the bottom plate 35 closes the lower opening 30a of the casing 30. A connection hole 35b is formed on the substantial center of the bottom plate 35 to connect the valve chest 30S with the fuel tank FT. A through hole 33c is formed on the side wall 33. Namely the fuel tank FT communicates with the valve chest 30S via the connection hole 35b and through hole 33c. A circular spring support 35c is formed on the upper central portion of the bottom plate 35. The spring 46 is held between the spring support 35c and the lower inner surface of the float 40.

The float 40 received in the valve chest 30S has an upper wall 41 and a cylindrical side wall 42 that extends downward from the circumference of the upper wall 41. An inner space of the float 40 forms a buoyancy chamber 40S to give the buoyancy to the float 40. A guide protrusion 40a is formed along a vertical axis on the outer circumferential surface of the float 40 and guided by the guide protrusion 33b formed on the casing 30.

The cover 50 includes a cover main body 51, a tubular body 52 projected upward in an L shape from the substantial center of the cover main body 51, a flange 53 formed around the cover main body 51, and a support member 54 projected downward from the cover main body 51. These constituents of the cover 50 are formed by integrally molding. A cover fitting element 51a is formed on the upper central portion of the cover main body 51, in order to receive the upper projection element 32a of the casing 30. A cover passage 52a is formed in the tubular body 52, and has one end connecting with the connection conduit 32b of the casing 30 and the other end connecting with the canister. A circular welding end 53a, which is to be welded to the upper tank wall FTa of the fuel tank FT, is formed on the lower end of the flange 53. The support member 54 is projected in a cylindrical shape to receive the upper wall of the casing 30 therein. A slit 54a having a lower open end (see FIG. 3) and engagement apertures 54b are formed in the support member 54.

Holders 38 and engagement projections 39 are formed to join the casing 30 and the cover 50 with each other. There are four holders 38 that have a cross section of an L-shape and are projected at an interval around the circumference on the upper outer circumferential surface of the casing 30. A space 38a is defined by the inside of each holder 38 and the outer surface of the casing 30. The end of the support member 54 is received and held in the spaces 38a. Four engagement projections 39 are formed above the respective holders 38 at an interval to engage with the engagement apertures 54b of the cover 50.

The following describes the process of mounting the fuel cutoff valve 20 to the upper tank wall FTa of the fuel tank FT. Referring to FIG. 2, the process first makes the float 40 and the spring 46 accommodated in the valve chest 30S of the casing 30, and positions the lower end of the spring 46 at the spring support 35c of the bottom plate 35. The process then makes the engagement elements 35a of the bottom plate 35 fitted in the engagement apertures 33a formed in the side wall 33, so as to attach the bottom plate 35 to the casing 30. The process subsequently inserts the upper projection element 32a into the O ring 36, so as to set the O ring 36 on the ring step 32f. Under such state, the upper wall of the casing 30 is fitted into the support member 54, and the upper projection element 32a is fitted into the cover fitting element 51a. The end of the support member 54 is received by the spaces 38a of the holder 38, and the engagement projections 39 engage with the engagement apertures 54b. This makes the cover 50 joined with the casing 30.

The process then fuses the circular welding end 53a of the cover 50 by means of a hot plate (not shown), while fusing a circumferential surface around the fixation hole FTc of the fuel tank FT by means of another hot plate (not shown) to form a welding part FTd. The process then inserts the casing 30 downward into the fixation hole FTc and presses the circular welding end 53a against the welding part FTd. As the circular welding end 53a and the welding part FTd are made of the same resin material and welded to each other under the cooling and solidifying conditions, the cover 50 is welded to the upper tank wall FTa and ensures the high sealing properties to seal the fuel tank FT from the outside.

The fuel cutoff valve 20 thus constructed works in the following manner. In the course of fuel supply into the fuel tank FT, the fuel vapor collecting in the upper space in the fuel tank FT escapes through the conduit to the canister with a rise of the liquid fuel level in the fuel tank FT. When the liquid fuel level in the fuel tank FT reaches the predetermined level FL1, the liquid fuel flows into the valve chest 30S through the connection hole 35b of the bottom plate 35. This gives the buoyancy to raise the float 40, and the valve element 41a closes the connection conduit 32b, so as to prevent the fuel from flowing out to the canister. This arrangement permits the fuel vapor to escape from the fuel tank FT via the through hole 33c and simultaneously prevents the liquid fuel from flowing out of the fuel tank FT in the course of fuel supply into the fuel tank FT.

In the fuel cutoff valve 20 of the above structure, the support member 54 of the cover 50 enters the fuel tank FT through the fixation hole FTC of the upper tank wall FTa. The support member 54 as well as the casing 30 is thereby exposed to the fuel and swells in the liquid fuel in the fuel tank FT. Since the cover 50 is made of the resin material having the greater fuel swelling property than the casing 30, and is accordingly expanded to a greater extent, the holders 38 formed on the casing 30 hold the cover 50 against the expansion of the cover 50. Namely, as the supporting force of the holders 38 increases with the swelling of the cover 50, the casing 30 is securely joined with the swelled cover 50 via the holders 38 and is made unmovable against the cover 50. The fuel cutoff valve 20 accordingly attains the stable valve opening and closing properties without any possible troubles due to the unsteady joint, for example, a lowered mechanical strength against shocks or a variation in opening and closing liquid levels of the fuel cutoff valve 20.

The engagement projections 39 functioning as the engagement means to join the casing 30 with the cover 50 are formed on the casing 30 that has the smaller swelling property. This arrangement maintains the sufficient mechanical strength and keeps the shape of the engagement projections 39, so as to further ensure the steady joint of the casing 30 with the cover 50.

The slit 54a formed in the support member 54 of the cover 50 absorbs the deflection of the cover 50 due to the expansion of the diameter of the swelled cover 50 and ensures the stable attachment.

Figure 4:
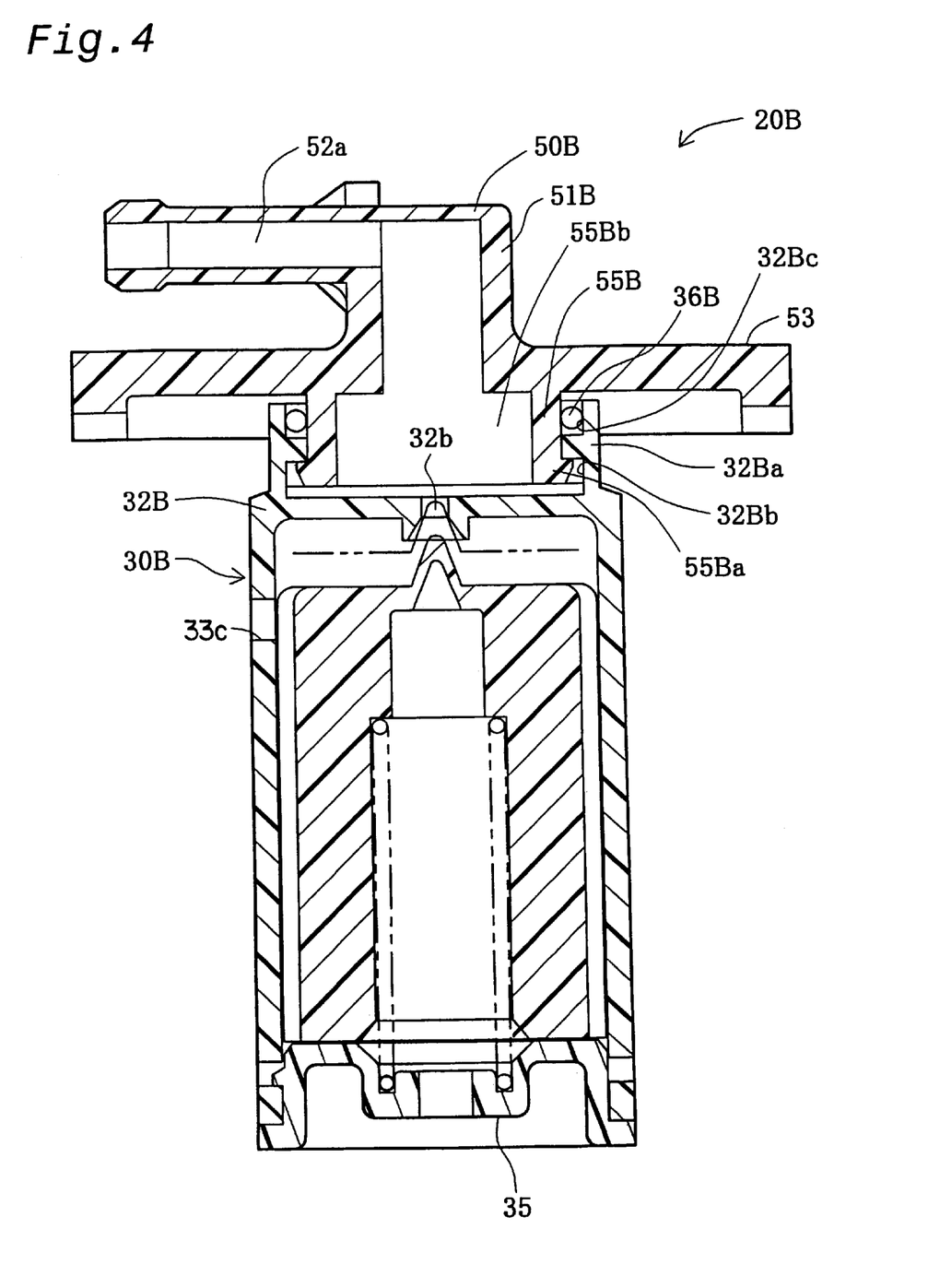
FIG. 4 is a sectional view illustrating another fuel cutoff valve in another embodiment according to the present invention.

FIG. 4 is a sectional view illustrating another fuel cutoff valve 20B in another embodiment according to the present invention. The fuel cutoff valve 20B shown in FIG. 4 adopts different engagement means and holding means to join a casing 30B with a cover 50B from those of the fuel cutoff valve 20 shown in FIG. 1. A cylindrical holder 32Ba (holding means) is formed on a top wall 32B of the casing 30B. Pluralities of engagement recesses 32Bb are formed on the lower end of the holder 32Ba to receive the cover 50B therein. An O-ring 36B is held on a ring step 32Bc, which is formed on the upper end of the holder 32Ba. A support member 55B is projected downward from a cover main body 51B of the cover 50B. Engagement projections 5Ba, which function in combination with the engagement recesses 32Bb as the engagement means, are formed on the end of the support member 55B. When the support member 55B is fitted into the holder 32Ba, the engagement projections 55Ba engage with the engagement recesses 32Bb, so that the cover 50B is joined with the casing 30B. An inner chamber 55Bb is formed inside the support member 55B of the cover 50B. The inner chamber 55Bb connects the connection conduit 32b of the casing 30B with the cover passage 52a.

In the fuel cutoff valve 20B of the above structure, the flow of fuel passes through the inner chamber 55Bb defined by the support member 55B of the cover 50B, so that the support member 55B swells in the liquid fuel in the fuel tank FT. The holder 32Ba formed on the casing 30B comes into contact with the expanding face of the support member 55B of the cover 50B that swells in the fuel, and securely holds the support member 55B. Since the supporting force of the holder 32Ba increases with the swelling of the support member 55B, the casing 30B is securely joined with the swelled cover 50B via the holder 32Ba and the support member 55B and is made unmovable against the cover 50B.

The present invention is not restricted to the above embodiments or their modifications, but there may be many other modifications, changes, and alterations without departing from the scope or spirit of the main characteristics of the present invention. Some examples of possible modification are given below.

(1) In the above embodiments, polyacetal is applied for the resin material of the casing, and polyethylene is applied for the cover. Other combinations of resin materials may, however, be applied for the casing and the cover, as long as the cover is made of a resin material that can be thermally welded to the fuel tank and the casing is made of a resin material that has different fuel swelling property from that of the resin material of the cover. Available examples of the resin material for the cover include polypropylene and polyketone, and those for the casing include nylon and PBT (polybutylene terephthalate).

(2) The principle of the present invention is applicable to any fuel cutoff valves that are mounted on the fuel tank; for example, valves that cutoff the further supply of fuel at a full liquid fuel level, cutoff valves that prevent the outflow of fuel when the fuel tank is tilted, and diaphragm valves.

The scope and spirit of the present invention are limited only by the terms of the appended claims.

What is claimed is:

1. A fuel cutoff valve that is to be partly inserted in a fixation hole formed in an upper tank wall of a fuel tank, so as to be mounted on said upper tank wall, said fuel cutoff valve comprising:
   a cover that is made of a first resin material, which enables said cover to be thermally welded to said upper tank wall, said cover including a circular welding end that is constructed and arranged to be thermally welded to said upper tank wall to surround a circumference of the fixation hole, a fuel conduit that is constructed and arranged to connect said fuel tank to the outside, and a support member that is constructed and arranged to be inserted into the fixation hole;
   a casing that is made of a second resin material, which has a smaller fuel swelling property than the first resin material, said casing including a valve chest that is constructed and arranged to connect said fuel tank to a connection conduit;
   wherein said casing has an upper protrusion that forms part of said connection conduit, said cover including a mating recess, in which said upper protrusion is fitted;
   a valve member that is accommodated in said valve chest to open and close said connection conduit according to a level of a liquid fuel in said fuel tank;
   mating engagement elements that are respectively formed on said support member and said casing, said mating engagement elements engaging with each other to join said support member and said casing; and
   a holder unit that is formed on said casing and is in contact with said support member, said holder unit being constructed and arranged to increase a supporting force against said support member when said support member swells in the liquid fuel;
   wherein said holder unit includes a holder that is protruded from a side wall of said casing, so that said holder holds a lower end of said support member with the side wall of said casing.

2. A fuel cutoff valve in accordance with claim 1, further comprising a sealing member held between said upper protrusion and a wall of said mating recess.

3. A fuel cutoff valve in accordance with claim 1, wherein the first resin material is polyethylene and the second resin material is polyacetal.

4. A fuel cutoff valve that is to be partly inserted in a fixation hole formed in an upper tank wall of a fuel tank, so as to be mounted on said upper tank wall, said fuel cutoff valve comprising:
   a cover that is made of a first resin material, which enables said cover to be thermally welded to said upper tank wall, said cover including a circular welding end that is constructed and arranged to be thermally welded to said upper tank wall to surround a circumference of the fixation hole, a fuel conduit that is constructed and arranged to connect said fuel tank to the outside, and a support member that is constructed and arranged to be inserted into the fixation hole;
   wherein said support member has a plurality of slits that are arranged at an interval along a circumference thereof;
   a casing that is made of a second resin material, which has a smaller fuel swelling property than the first resin material, said casing including a valve chest that is constructed and arranged to connect said fuel tank to a connection conduit;
   a valve member that is accommodated in said valve chest to open and close said connection conduit according to a level of a liquid fuel in said fuel tank;
   mating engagement elements that are respectively formed on said support member and said casing, said mating engagement elements engaging with each other to join said support member and said casing;
   wherein said mating engagement elements include an engagement projection that is protruded from said casing, and an engagement aperture that is formed on said support member and receives said engagement projection fitted therein; and
   a holder unit that is formed on said casing and is in contact with said support member, said holder unit being constructed and arranged to increase a supporting force against said support member when said support member swells in the liquid fuel.

5. A fuel cutoff valve in accordance with claim 4, wherein said casing has an upper protrusion that forms part of said connection conduit, said cover including a mating recess, in which said upper protrusion is fitted; and,
   a sealing member held between said upper protrusion and a wall of said mating recess.

6. A fuel cutoff valve in accordance with claim 4, wherein the first resin material is polyethylene and the second resin material is polyacetal.

7. A fuel cutoff valve that is to be partly inserted in a fixation hole formed in an upper tank wall of a fuel tank, so as to be mounted on said upper tank wall, said fuel cutoff valve comprising:
   a cover that is made of a first resin material, which enables said cover to be thermally welded to said upper tank wall, said cover including a circular welding end that is constructed and arranged to be thermally welded to said upper tank wall to surround a circumference of the fixation hole, a fuel conduit that is constructed and arranged to connect said fuel tank to the outside, and a support member that is constructed and arranged to be inserted into the fixation hole;

a casing that is made of a second resin material, which has a smaller fuel swelling property than the first resin material, said casing including a valve chest that is constructed and arranged to connect said fuel tank to a connection conduit;

a valve member that is accommodated in said valve chest to open and close said connection conduit according to a level of a liquid fuel in said fuel tank;

mating engagement elements that are respectively formed on said support member and said casing, said mating engagement elements engaging with each other to join said support member and said casing;

wherein said mating engagement elements include an engagement projection that is protruded from said casing, and an engagement aperture that is formed on said support member and receives said engagement projection fitted therein; and a holder unit that is formed on said casing and is in contact with said support member, said holder unit being constructed and arranged to increase a supporting force against said support member when said support member swells in the liquid fuel; the holder unit arranged to be separated from the mating engagement elements and in a lower position from the mating engagement elements;

wherein said holder unit includes a holder that is protruded from a side wall of said casing, so that said holder holds a lower end of said support member with the side wall of said casing.

8. A fuel cutoff valve in accordance with claim 7, wherein said casing has an upper protrusion that forms part of said connection conduit, said cover including a mating recess, in which said upper protrusion is fitted; and, a sealing member held between said upper protrusion and a wall of said mating recess.

9. A fuel cutoff valve in accordance with claim 7, wherein the first resin material is polyethylene and the second resin material is polyacetal.

10. A fuel tank comprising a resin upper tank wall with a fixation hole and a fuel cutoff valve that is partly inserted in the fixation hole, so as to be mounted on said upper tank wall, said fuel cutoff valve comprising:

a cover that is made of a first resin material, which enables said cover to be thermally welded to said upper tank wall, said cover including a circular welding end that is thermally welded to an upper surface of said upper tank wall to surround a circumference of the fixation hole, a fuel conduit that connects said fuel tank to the outside, and a support member that is constructed and arranged to be inserted into the fixation hole;

a casing that is made of a second resin material, which has a smaller fuel swelling property than the first resin material, said casing including a valve chest that is constructed and arranged to connect said fuel tank to a connection conduit;

wherein said casing has an upper protrusion that forms part of said connection conduit, said cover including a mating recess, in which said upper protrusion is fitted;

a valve member that is accommodated in said valve chest to open and close said connection conduit according to a level of a liquid fuel in said fuel tank;

mating engagement elements that are respectively formed on said support member and said casing, said mating engagement elements engaging with each other to join said support member and said casing; and a holder unit that is formed on said casing and is in contact with said support member, said holder unit being constructed and arranged to increase a supporting force against said support member when said support member swells in the liquid fuel;

wherein said holder unit includes a holder that is protruded from a side wall of said casing, so that said holder holds a lower end of said support member with the side wall of said casing.

11. A fuel tank in accordance with claim 10, wherein the resin of said upper tank wall and the first resin material are polyethylene and the second resin material is polyacetal.

* * * * *